United States Patent [19]
Kondo

[11] 3,866,983
[45] Feb. 18, 1975

[54] ANTI-SKID DEVICE FOR AUTOMOTIVE VEHICLES

[75] Inventor: Toshiyuki Kondo, Toyota, Japan

[73] Assignee: Aisin Seiki kabushiki Kaisha, Kariya City, Japan

[22] Filed: May 22, 1974

[21] Appl. No.: 472,502

[30] Foreign Application Priority Data
June 1, 1973  Japan............................ 48-61692

[52] U.S. Cl............................................... 303/21 F
[51] Int. Cl................................................ B60t 8/02
[58] Field of Search......... 188/181 A; 303/10, 21 F, 303/21 P, 21 CF, 21 CG, 21 CE

[56] References Cited
UNITED STATES PATENTS

| | | | |
|---|---|---|---|
| 3,306,677 | 2/1967 | Dewar et al..................... | 303/21 FM |
| 3,414,336 | 12/1968 | Atkin et al..................... | 303/21 FM |
| 3,663,069 | 5/1972 | Perry et al...................... | 303/21 PJ |
| 3,774,976 | 11/1973 | Parsons.......................... | 303/21 FM |

Primary Examiner—Duane A. Reger
Attorney, Agent, or Firm—James E. Mrose

[57] ABSTRACT

A hydraulic anti-skid braking system for vehicles, in which a release of braking pressure takes place when the wheel is in an incipient locking condition and is followed by reapplication of braking pressure upon ceasing of such locking condition. A pressure controlled valve is provided for effectively controlling the reapplication at a reasonable speed while rapid initial application of braking pressure is ensured at a stage at which anti-skid control device does not operate. Throttle means are further provided to restrict the discharge at a reasonable speed so that thereby a gradual release and gradual increase of braking pressure is effected in every anti-skid cycle of operation. A desirably controlled speed of anti-skid cycle of operation is thus obtained.

6 Claims, 3 Drawing Figures 3,866,983

ANTI-SKID DEVICE FOR AUTOMOTIVE VEHICLES

BACKGROUND OF THE INVENTION

This invention relates to an anti-skid device for automotive vehicles and more particularly to a control device for the anti-skid device of powered braking systems of an automotive vehicle.

A fundamental problem in anti-skid device of the powered braking system is due to the difficulties in achieving satisfactorily controlled anti-skid operation particularly in increasing and decreasing the fluid braking pressure at a reasonable speed in an anti-skid cycle of operation.

In order to avoid any jerking or jolting due to a sudden or quick change of braking pressure, the release and reapplication of braking pressure should preferably be at a reasonable speed in every anti-skid cycle of operation.

On the other hand, any lag should not be permitted in the initial application of braking pressure under normal braking condition under which the anti-skid device does not operate and braking continues normally.

A solenoid operated valve, whilst easily conceived to meet such somewhat contradictious two requirements, has several disadvantages most of which are due to the relative complexity of the structure and this increases the cost.

SUMMARY OF THE INVENTION

It is an object of the present invention, therefore, to provide a hydraulic anti-skid control device adapted to the powered braking system of automotive vehicles and having no solenoid operated valve for controlling pressure decreasing and increasing caused by the anti-skid valve.

According to the present invention there is provided an anti-skid braking system for at least one wheel of a vehicle, of the type comprising a reservoir of hydraulic fluid, a source of hydraulic pressure, a pressure operated brake connectible to the hydraulic pressure source, pressure discharge means operable to release the pressure in the brake, and an anti-skid device sensitive to the dynamic state of the wheel to actuate the pressure discharging means during braking in dependence on the dynamic state of the wheel in which the discharge means include a discharge path from the brake, the path having a solenoid operated anti-skid valve to perform anti-skid operation in response to the signal from the anti-skid device.

The system is further characterized by a provision of a pressure controlled valve disposed between the pressure source and the pressure discharge means and having a throttle and a control gate which is sensitive to the braking pressure to close the valve if the braking pressure exceeds a predetermined threshold value so that the only available path to the brake is a path through the throttle to thereby hold increasing of the braking pressure at a reasonable speed.

The anti-skid valve may be still accompanied by a throttle to additionally restrict pressure decreasing speed to a predetermined speed.

Still further, the anti-skid valve may be preceded by a solenoid operated throttle valve sensitive to the signal from the anti-skid device during anti-skid operation.

Further features and advantages of the invention will become apparent during the course of the following description with reference to the drawings.

DESCRIPTION OF THE PREFERRED EMBODIMENTS

Figure 1:
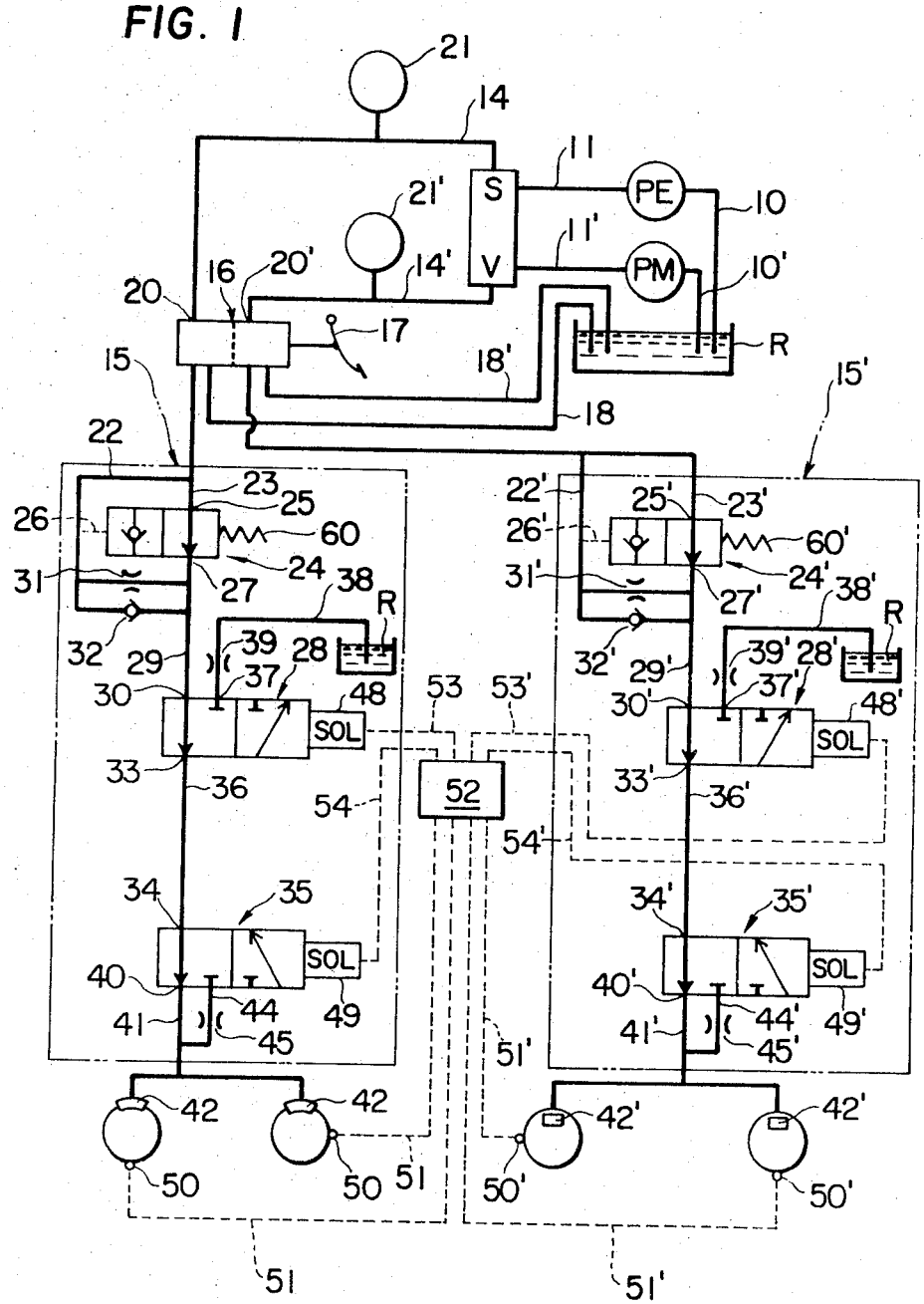
FIG. 1 is diagrammatic illustration of one embodiment of an anti-skid braking system constructed in accordance with the present invention.

Now referring to FIG. 1, there is shown a pair of fluid braking circuits or systems 15 and 15'. One circuit is provided for front wheel brakes and the other is for the rear wheel brakes. There is no reason except for the sake of safety of braking effect why such twin braking systems are provided for one vehicle, and this does not form the invention. The two systems are functionally and constructionally the same so that description will be made with reference to one of the two circuits hereinbelow.

A volumetric or positive displacement hydraulic pump PE is driven by the engine of a vehicle (not shown) and draws hydraulic fluid from a reservoir R, via a pipe 10, and in turn pumps it along a pipe 11 which leads to a safety valve SV. Another pump PM is completely identical functionally and constructionally with the pump PE except that it is driven by a suitable electric motor (not shown) only in case of accidental stop of function of the pump PE. The pump PM also draws hydraulic fluid from the reservoir R, via a pipe 10' and pumps it along pipe 11' which leads to the safety valve SV.

The safety valve SV delivers fluid through pipes 14 and 14' respectively into the two braking systems 15 and 15' which will be described in detail hereinbelow. In the event of accidental breakage of one of the braking systems, the safety valve blocks transmission of fluid pressure to such system, so that delivering fluid into the remaining circuit may be ensured. The safety valve is of conventional construction and its operation and use is so well known in the art that detailed description is not required for full understanding of the invention.

The pipes 14 and 14' respectively leads to inlets 20 and 20' of a normally closed valve 16, which can be opened progressively by means of brake pedal 17. For this purpose, the control valve 16 has a pair of functionally the same valve members which are adapted to be operated by the pedal to control flow of fluid through the pipes 14 and 14', the control valve 16 and pipes 22 and 22' respectively, to the brakes. Connected to the pipes 14 and 14', there are accumulator tanks 21 and 21' respectively.

Since the brake systems 15 and 15' are of the same construction so that functionally the same parts are designated by the same reference characteristics with distinguishing single-prime accents being added to those in the system 15'. Such illustration will permit some abbreviations of duplicate description as to the same parts in the system 15'.

The outlet of the valve 16 is connected to the pipe 22 having a branch 23. The pipe 22 leads into an inlet 26 and the pipe 23 leads into an inlet 25 of a pressure controlled valve 24. The outlet opening 27 of the valve 24 is connected to an inlet 30 of an anti-skid valve 28 via a pipe 29. The pipe 22 also leads to the inlet 30 of the anti-skid valve 28 via a throttle 31. The pipe 22 further leads to the inlet 30 through a check valve 32 in parellel with the throttle 31. The valve 24 is controlled by means of a control port 26 fed through the pipe 22 by the pressure delivered through the valve 16.

The valve 28 is a solenoid operated valve and hereinafter will be termed electrovalve for convenience. The valve is a three port two position valve which normally connects the pipe 29 with an outlet 33. The outlet 33 is connected through pipe 36 to an inlet 34 of a bypath valve 35.

The normally closed outlet 37 of the valve 28 is connected to a pipe 38 which leads to the reservoir R via a throttle opening 39. The valve 35 is aslo a solenoid operated valve and is also termed electrovalve. The electrovalve 35 is also a three port, two position valve which normally connects the pipe 36 with an outlet 40 which is connected to a pipe 41 which branches into two pipes as to lead to a pair of braking calipers 42 of the front wheels (not shown) of the vehicle.

The calipers 42, when actuated by pressure via the pipe 41, clamp onto a brake disc (not shown) which is carried by the axis of a front wheel of the vehicle to effect braking of the wheel in the known normal manner of disc brake. The pipe 41 has a branch 44 which leads to another inlet of the valve 35 through a throttle 45.

The speed of the front wheel is detected by a sensor 50, which may, for example, by a dynamo tachometer. Lines 51 supplies a signal representing the velocity of the wheel from the tachometer 50 to an anti-skid control mechanisms 52, which can be of any suitable known type. The control mechanisms 52 supplies an output voltage signal to lines 53 and 54 when the deceleration of the wheel exceeds a predetermined threshold valve, indicating imminent sliding of the wheel. A voltage signal on the lines 53 and 54 thus energises the solenoids 48 and 49 of the electrovalves 28 and 35 respectively when sliding of the wheel is imminent as determined by the control mechanism 52 based upon the information signal from the tachometer 50.

The electrovalves 35 and 28 are also of conventional construction and their operation and use is so well known in the art that a detailed description is not required for a full understanding of the invention.

The valve 24 is normally kept open by a calibrated spring 60, which acts against the pressure in the control port 26. The valve 24 closes when the pressure in the port 26 or the pipe 22 exceeds the calibration threshold of the spring 60.

Figure 2:
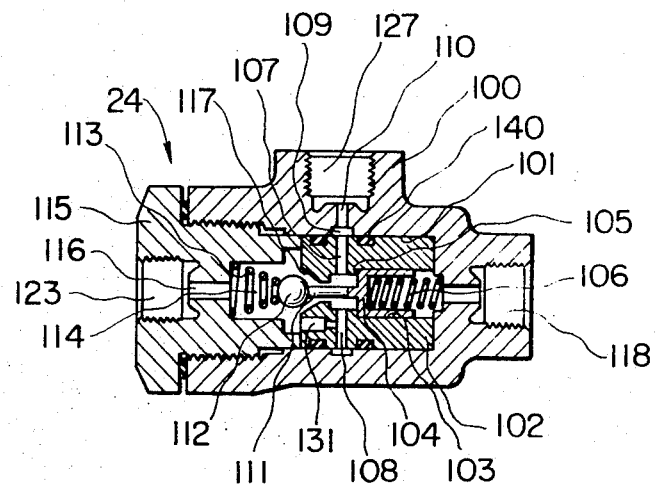
FIGS. 2 and 3 are axial sections of alternative embodiments of a pressure controlled valve suitable for use in the braking system of FIG. 1.

FIG. 2 is an axial section of a pressure controlled valve, suitable for use as the valve 24 of FIG. 1.

With reference to FIG. 2, the valve 24 comprises a valve body 100 having a bore 101 within which is received a spool 102. The spool 102 has a cylindrical stepped bore 103. Within the cylindrical bore there is located a piston 104 which is normally urged toward abutment against a shoulder 105 of the apool by a compressed spring 106. Communicating the cylindrical bore 103, there are openings 107 and 108 in the spool 102. The two openings face each other across the bore 103. The opening 107 communicates with the outlet port 127 via a annular groove 109 and an opening 110 of the body. The piston has a stem 111 exially extending from its end face exposed against the input pressure within the bore 103. The extremity of the stem 111 normally receives a ball 112 which is normally urged toward the extremity of the stem 111 by another compressed spring 113 which extends between the end of a bore 114 in a plug 115 and the ball 112. The plug 115 is threaded into the bore 101 to hold the spool in position. There is no reason except for the sake of assembling convenience why the spool should be provided. The plug 115 is provided with an inlet opening 123 communicating with the bore 114 of the plug via opening 116. The spool 102 is further provided with a throttle opening 131 which connects the bore 114 with the opening 108. When a control pressure is applied via the pipe 22 (FIG. 1), inlet 123 and opening 116 into the bore 114, it exerts a force on the left face of the piston 104 past the unseated ball 112. When this force is larger than the calibration threshold of the spring 106, the piston 104 moves sharply, that is in instantaneous manner towards the right in the view thus causing the ball 112 to seat against the seat 117, thereby interrupting the path past the valve assembly formed of the ball and the seat. The ball 112 is urged to continue to seat by application of the fluid pressure to exert such larger force within the chamber 114. It should be noted that the force of the spring 113 is so calculated in design that the spring 113 is normally overcome by the spring 106. It will be understood that after the ball is seated the fluid pressure applied to the bore 114 is transmitted to the outlet port 127 via the throttle opening 131. The slight leakages of hydraulic fluid past the piston 1o4 flow to the reservoir R through suitable conduit (not shown), via an outlet 118.

It will be noted that the outlet 127 corresponds to the outlet 27 of FIG. 1 and the inlet 123 to the inlets 23 and 26 of FIG. 1.

It will be understood that although there is a fluid flow route through the throttle 131 when the ball is unseated, this is negligible in view of the greater resistance offered by the throttle 131 in comparison with the relatively unrestricted flow path through the unseated ball 112.

Figure 3:
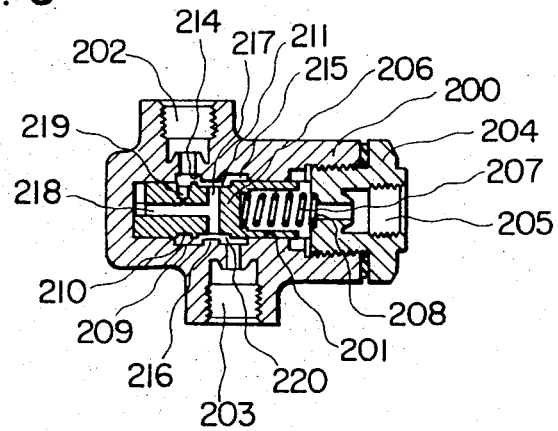

FIG. 3 illustrates a second type of pressure controlled valve suitable for use as the valve 24 in the circuit of FIG. 1. The valve comprises a valve casing 200 having a cylindrical bore 201, in the side wall of which there is an inlet 202 and outlet 203. The plug 204 has an outlet 205 for the slight leakages of hydraulic fluid past the piston 206 to flow to the reservoir R. A threshold spring 207 extends between a centering depression 208 in the internal face of the plug and the internal end face of the hollow piston 206 thus urging the piston toward the end face of the bore. The piston has two annular recessed portions 210 and 211 which provide an annular rib portion 209. Two spaced annular grooves 214 and 215 are formed in the internal surface of the bore 201 so that annular rib 216 is formed between them. The both ribs 209 and 216 cooperate to provide valve means when the piston slides in the cylindrical bore 201.

The piston 206 has a radial bore 217 at the portion 211 communicating with which there is an axial bore 218 leading to the end face of the piston. The piston also has a throttle opening 219 at the other recessed portion 210 communicating with the axial bore 218. In the rest position, the piston is in the position shown in FIG. 3, so that fluid passageway is provided from the inlet 202 via annular groove 214, cylindrical bore 201 and annular groove 215 to the outlet 203.

In normal conditions when there is little or no pressure in the control port the spring 207 urges the piston 206, toward the left end, thereby holding the rib 209 away from the other rib 216 and allowing the free flow of hydraulic fluid from the inlet 202 via the annular groove 214, cylindrical bore 201 and annular groove 215 to the outlet 203. By applying a control pressure through the pipe 23 and the inlet 202 to the bore 201, such as to exert upon the piston 206 which is greater than the calibration threshold of the spring 207, the piston 206 is moved sharply to a position where the two ribs 209 and 216 closes the path between the annular grooves 214 and 215, thereby interrupting any such free flow as above mentioned. The fluid flow thereafter is only allowed through the throttle opening 219, that is from the inlet 202 via the annular groove 214, cylindrical bore 201, throttle opening 219, axial bore 218, radial bore 217, cylindrical bore 201 and annular groove 215 to the outlet 203.

The circuit of FIG. 1 with either the valve of FIG. 2 or the valve of FIG. 3, operates as follows:

Under normal running conditions, that is when the brakes are not applied, the hydraulic fluid pumped by volumetric or positive displacement pump PE discharges into the accumulator tank 21 through the pipe 11, safety valve SV and pipe 14 and pressure is thus accumulated within the tank. When the brakes are applied by pressure upon the pedal 17 the normally closed valve 16 progressively opens passageway of the fluid depending on the pressure on the brake pedal 17, thereby increasing the pressure in the pipe 22 by an amount which is proportional to the amount by which the brake pedal 17 is depressed.

Under a condition in which the pressure applied to the control port 26 of the valve 24 is of lesser value than that predetermined threshold value, the valve 24 is opened. Since the antiskid valve 28 and the bypass valve 35 are normally open, the pressure in the pipe 14 is applied to the brake caliper 42 via pipe 23, valve 24, outlet 27, pipe 29, valve 28, pipe 36 and valve 35 thereby braking the vehicle wheel (not shown).

When the brake pedal 17 is released, the pressure in the pipe 41 discharges immediately through the valve 35, pipe 36, valve 28, pipe 29, outlet 27, valve 24, pipe 23, valve 16 and pipe 18 to the reservoir R. This has no effect, however, if the anti-skid control device 52 does not operate and the braking continues normally. The check valve 32 provides another route other than that through the ports 27 and 25 and branch pipe 23 to permit fluid to rapidly discharge into the reservoir R.

When the braking pressure exceeds a predetermined threshold pressure whereby the force of the calibrated spring 106 is overcome, the ball 112 seats to thereby restrict the fluid flow by causing it to pass the throttle opening 31. This is important to obtain the desired result.

Now considering the case where the valve 24 is closed as above mentioned and the wheel of the vehicle undergoes excessive deceleration during braking, such as to cause an incipient locking condition. In this case the braking pressure applied to the brake calipers 42 will have risen above a calibration threshold of the valve 24 before the anti-skid control device 52 operates so that the pressure communicated to the control port 26 through the pipe 22 will have closed the valve 24.

As before, the antiskid control device 52, detects the incipient locking condition and energises the solenoids 48 and 49 respectively through lines 53 and 54. The pipe 41 is accordingly connected via pipe 44 on which is disposed the throttle 45, valve 35, pipe 36, valve 28, port 37, and pipe 38 on which is disposed the throttle 39 to the reservoir R, causing a gradual diminution of pressure.

Normally, at some value of pressure at some discharging stage, the vehicle wheel will no longer be in an incipient locking condition, the anti-skid control device 52 will then de-energise the solenoids 48 and 49. When this occurs, then the pipe 41 is re-connected to the pipe 29 as viewed in FIG. 1, and the braking pressure increases to the pressure in the pipe 29 (assuming the brake pedal is still depressed). The circuit returns to its initial condition, in preparation for another anti-skid cycle of operation.

It can be seen from the foregoing that the discharging and charging of the fluid is performed during the anti-skid operation through the throttles 45 and 39 and the throttle 31 respectively.

The function of the valve 24 is to provide throttle means for the gradual increase of braking pressure at the re-charging stage in the anti-skid cycle of operation. As the throttles 45 and 39 also cause a gradual diminution of braking pressure at the discharging stage in the cycle, the circuit will always achieve a gradual release and gradual increase of braking pressure in every cycle of operation thus avoiding excessive shuddering on braking.

Although fluid flow is restricted by the valve 24 in the normal braking condition in which no anti-skid operation is performed, such restriction is acceptable in view of the fact that a major substantial braking pressure is applied before the valve 24 is transferred to its closed position and there is no lag in applying braking pressure in the normal mode of operation.

The valves shown in FIGS. 2 and 3 are eminently suitable for use as the valve 24 of FIG. 1 by reason of the fact that they are both of simpler construction and of liliable characteristic.

What is claimed is:

1. An anti-skid braking system for at least one wheel of a vehicle, comprising
    a hydraulic fluid reservoir,
    a hydraulic pressure pump having an inlet and an outlet, said inlet communicating with said reservoir,
    a pressure operated brake,
    conduit means connecting the outlet of said hydraulic pump to said pressure operated brake,
    normally closed control valve means disposed in said conduit means, said normally closed control valve means being operatively connected with a brake pedal for selectively controlling said control valve means to control the flow of fluid through said conduit means,
    pressure controlled valve means disposed in said conduit means, said pressure controlled valve means including,
        means defining a first path from said hydraulic pressure pump to said pressure operated brake,
        a throttle in said first path,
        means defining a second path in parallel with said first path,
        a valve member in said second path, a control gate communicating with said pressure operated brake and responsive to the braking pressure to close said valve member and block said second path when the braking pressure exceeds a predetermined threshold value so that only available brake pressure applying path is said first path through said throttle, and pressure discharging means including, an alectronic anti-skid control device sensitive to the dynamic state of said wheel, said electronic anti-skid control device being operatively connected with said pressure discharging means to actuate said pressure discharging means during a wheel braking operation in response to the dynamic state of the wheel being braked to selectively release the braking pressure being applied to said pressure operated brake to prevent a vehicle skidding condition from arising.

2. The anti-skid braking system of claim 1 wherein, said pressure discharging means further includes a throttle to discharge the braking pressure through said throttle whereby flow of fluid in discharging braking pressure is restricted to a predetermined speed.

3. The anti-skid braking system of claim 1 wherein, solenoid operated throttle means is further included in said discharge means to be operatively connected to the electronic anti-skid device for additionally restricting flow of fluid when the braking pressure is discharged into said reservoir.

4. The anti-skid braking system of claim 1 wherein, said pressure controlled valve means is accompanied by check valve means in parallel with said second path to normally block charging flow of fluid but to open for rapid discharging flow of fluid in releasing the braking pressure at the terminal end of a braking operation.

5. The anti-skid braking system of claim 1 wherein, said pressure controlled valve means is a valve comprising a piston slidable in a bore, means resiliently biasing said piston in one direction along said bore to a first position, a seat and ball assembly to allow or block fluid flow therethrough, said ball being normally caused to unseat from said seat by said piston in its first position, a control chamber within which pressure is applied to move said piston in the other direction to a second position, a pressure inlet to said control chamber, a pressure outlet to said control chamber, and a throttle in parallel relation with said seat and ball assembly, said ball and seat assembly allowing communication between said inlet and said outlet when said piston is in said first position, said piston moving to said second position to cause said ball to seat for blocking said communication when the control pressure exceeds a predetermined threshold valve while ensuring another route through said throttle to maintain a controlled communication between said inlet and said outlet.

6. The anti-skid braking system of claim 1 wherein, said pressure controlled valve means is a valve comprising a piston slidable in a bore, means resiliently biasing said piston in one direction along said bore to a first position, a control chamber within which pressure is applied to move said piston in the other direction to a second position, an intermediate annular first rib portion on said piston, a second rib portion in the internal surface of said chamber, a pressure inlet to said control chamber, a pressure outlet from said control chamber, and a throttle interposed between said inlet and said outlet, said first and second rib portions allowing communication between said inlet and said outlet when said piston is in said first position, said piston moving to said second position to block said communication when the control pressure exceeds a predetermined threshold value by said first and second rib portions to interrupt fluid flowing between said inlet and said outlet while ensuring another route through said throttle to maintain a controlled communication between said inlet and said outlet.

* * * * *